United States Patent
Shimakata et al.

(10) Patent No.: US 8,326,550 B2
(45) Date of Patent: Dec. 4, 2012

(54) DIFFERENTIAL PRESSURE TRANSMITTER

(75) Inventors: Tetsuya Shimakata, Tokyo (JP); Koichi Kondo, Tokyo (JP)

(73) Assignee: Azbil Corporation, Tokyo (JP)

( * ) Notice: Subject to any disclaimer, the term of this patent is extended or adjusted under 35 U.S.C. 154(b) by 305 days.

(21) Appl. No.: 12/865,450

(22) PCT Filed: Jan. 14, 2009

(86) PCT No.: PCT/JP2009/050367
§ 371 (c)(1),
(2), (4) Date: Jul. 30, 2010

(87) PCT Pub. No.: WO2009/096224
PCT Pub. Date: Aug. 6, 2009

(65) Prior Publication Data
US 2011/0004424 A1 Jan. 6, 2011

(30) Foreign Application Priority Data
Jan. 31, 2008 (JP) ................................ 2008-020718

(51) Int. Cl.
*G01L 7/00* (2006.01)
*G06F 19/00* (2006.01)
(52) U.S. Cl. ............... 702/50; 73/716; 375/295; 702/47
(58) Field of Classification Search .................... 702/45, 702/47, 50, 57, 79, 83, 89, 96, 98, 100, 104, 702/138; 73/706, 716; 375/295; 340/870.16; 341/155; 324/76.48
See application file for complete search history.

(56) References Cited

U.S. PATENT DOCUMENTS

| 4,866,435 A | 9/1989 | Frick |
| 5,909,188 A | 6/1999 | Tetzlaff et al. |
| 7,770,459 B2 * | 8/2010 | Klosinski et al. ............... 73/716 |
| 8,170,134 B2 * | 5/2012 | Yoshino et al. ............... 375/295 |
| 2002/0016694 A1 | 2/2002 | Tsuji |

FOREIGN PATENT DOCUMENTS

| JP | 62-066705 A | 3/1987 |
| JP | 2-88921 A | 3/1990 |
| JP | 3-500717 A | 2/1991 |
| JP | 4-21977 U | 2/1992 |
| JP | 4-177599 A | 6/1992 |
| JP | 4-195610 A | 7/1992 |
| JP | 5-113379 A | 5/1993 |
| JP | 6-019530 A | 1/1994 |
| JP | 2002-048663 A | 2/2002 |
| JP | 2003-162790 A | 6/2003 |

* cited by examiner

*Primary Examiner* — John H Le
(74) *Attorney, Agent, or Firm* — Troutman Sanders LLP

(57) ABSTRACT

When the damping time constant $D\tau$ is changed to $D\tau=0$, the sampling period Ts is automatically changed from 100 ms to 50 ms. The sampling time is automatically changed from 60 ms to 30 ms. Thus, when the damping time constant $D\tau$ is changed to $D\tau=0$, a processing unit samples an electrical signal corresponding to the pressure difference of a fluid detected by a differential pressure sensor for the sampling time ts=30 ms in every sampling period Ts=50 ms, and finds the measurement value $\Delta P$ of the differential pressure by performing a variety of operation processing including a linearization operation and a square root operation on the sampled electrical signal. In the operation processing, the processing unit does not perform a damping operation.

3 Claims, 8 Drawing Sheets

DIFFERENTIAL PRESSURE TRANSMITTER

CROSS REFERENCE TO PRIOR APPLICATIONS

This application is a U.S. National Phase application under 35 U.S.C. §371 of International Application No. PCT/JP2009/050367, filed on Jan. 14, 2009 and claims benefit of priority to Japanese Patent Application No. 2008-020718, filed on Jan. 31, 2008. The International Application was published in Japanese on Aug. 6, 2009 as WO 2009/096224 under PCT Article 21(2). All these applications are herein incorporated by reference.

FIELD OF TECHNOLOGY

The present invention relates to a differential pressure transmitting device for calculating a measured value for a differential pressure by performing a calculating process that includes at least a first-order delay calculation in an electric signal that is in accordance with a differential pressure in a fluid, sensed by a differential pressure sensor.

Conventionally differential pressure transmitting devices have been used as devices for sensing and transmitting differential pressures of fluids. (See, for example, Japanese Unexamined Patent Application Publication H2-88921). This differential pressure transmitting device comprises a differential pressure sensor, an A/D converting device, a processing device, and a D/A converting device, where a measuring diaphragm, which is a body that deforms with pressure, is provided within the sensor portion of the differential pressure sensor, and a pressure chamber A and a pressure chamber B are provided on both sides of this measuring diaphragm.

In this differential pressure transmitting device, a fluid pressure Pa is conveyed through a non-compressible fluid (such as silicone oil) to the pressure chamber A, and a fluid pressure Pb is conveyed through a non-compressible fluid (such as silicone oil) to a pressure chamber B. Doing so causes the measuring diaphragm to deform in accordance with |Pa−Pb| towards the side of the pressure chamber having the lower fluid pressure, where the state of deformation of the measuring diaphragm is sensed by a strain gauge to produce an electric signal (an analog value) in accordance with the differential pressure by a converting device, where the electric signal thus produced is sent to an A/D converting device to convert to a digital value.

The processing device samples the electric signal that has been converted into the digital value by the A/D converting device for a specific sampling interval ts with each of a specific sampling period Ts, calculates the measured value ΔP for the differential pressure by performing a variety of calculating processes such as a smoothing calculation, a square root calculation, a first-order delay calculation, or the like, and outputs the calculated differential pressure measurement value ΔP through a D/A converting device.

Note that in the above, the first-order delay calculation is also known as a damping calculation, and it is performed in order to control instability in an output. A damping time constant Dτ is used when performing a damping calculation. The setting for the damping time constant Dτ can be changed, and the greater the damping time constant Dτ, the more stable the output that can be obtained. However, doing so slows the speed of the calculating processes when the damping calculation is performed.

Additionally, when all of the various calculating processes, such as the smoothing calculation, the square root calculation, and the damping calculation, are performed, then, in consideration of the maximum calculating time Tmax that is required to do so, the sampling period Ts is set to be somewhat long as a constant value that is no less than the sampling interval ts added to the maximum calculating time Tmax. Moreover, in order to obtain a stable sampling value from the A/D converting device, it is effective to have the sampling interval ts be long, and thus the sampling interval ts will be set to be long (at a constant value), emphasizing the stability.

FIG. 10 illustrates the relationship between the sampling period Ts, the sampling interval ts, and the maximum calculating time Tmax. The differential pressure measured value ΔP is obtained for each sampling period Ts, after the sum of the sampling interval ts plus the maximum calculating time Tmax has elapsed.

In the differential pressure transmitting device set forth above, there is a demerit in the sense that the responsiveness will be poorer if the sampling period Ts and the sampling interval ts are long, and the stability of the measured value and the responsiveness have a trade-off relationship. In reality, in applications that require a differential pressure transmitting device there are various requirements for stability of the measured value and for responsiveness, and while some emphasize stability, others emphasize responsiveness.

Given this, when a differential pressure transmitting device is used in an application wherein responsiveness is emphasized, it is possible to reduce the damping time constant Dτ that is used in the damping calculation in order to achieve acceleration through completing of the damping calculation quickly. However, conventionally because the sampling period Ts and the sampling interval ts have been set on the long side as constant values, it is not been possible to perform thorough improvements when high-speed responsiveness has been required. Because of this, there has been a problem in that it has not been possible to accommodate applications that require high-speed responsiveness, such as fuel control in gas turbine generators.

The present invention is to resolve problem areas such as set forth above, and the object thereof is to provide a differential pressure transmitting device capable of responding to the need for high-speed responsiveness.

SUMMARY OF THE INVENTION

In order to achieve the object as set forth above, a differential pressure transmitting device that comprises: a differential pressure sensor for sensing a pressure differential in a fluid; sampling means for sampling, over a specific sampling interval at each specific sampling period, an electric signal that is in accordance with a pressure differential in the fluid, sensed by the differential pressure sensor; and differential pressure measurement value calculating means for calculating a measurement value for the differential pressure through performing a calculating process that includes at least a first-order delay calculation on the electric signal sampled by the sampling means; including: sampling condition automatic changing means for changing automatically the sampling conditions, with the sampling conditions being the sampling period and/or the sampling interval, so as to be shorter when the speed of the calculating process is faster, based upon parameters that determine the speed of the calculating process.

Given this, if, when calculating the measurement value for a differential pressure, the parameters that determine the speed of the calculating process change in the direction that makes the speed of the calculating process faster, the sampling period and/or the sampling interval are/is changed automatically so as to be shorter.

For example, if the parameter for determining the speed of the calculating process when calculating the measurement value for the differential pressure is defined as the damping time constant Dτ, the threshold value for determining that the speed of the calculating process has changed in the direction of being faster is defined as Dτ=0, and the damping time constant Dτ has changed so that Dτ=0, then the sampling period Ts is changed automatically from 100 ms to 50 ms and the sampling interval is changed automatically from 60 ms to 30 ms.

Given the present invention, because the sampling period and/or the sampling interval are/is defined as the sampling conditions, and the sampling conditions are changed automatically so as to be shorter when the speed of the calculating process is faster, it is possible to respond to requirements for increased responsiveness by automatically shortening the sampling period and/or the sampling interval when, for example, responsiveness is emphasized and the damping time constant is reduced.

DETAILED DESCRIPTION OF THE INVENTION

The present invention will be explained in detail below, based on the drawings.

Figure 1:
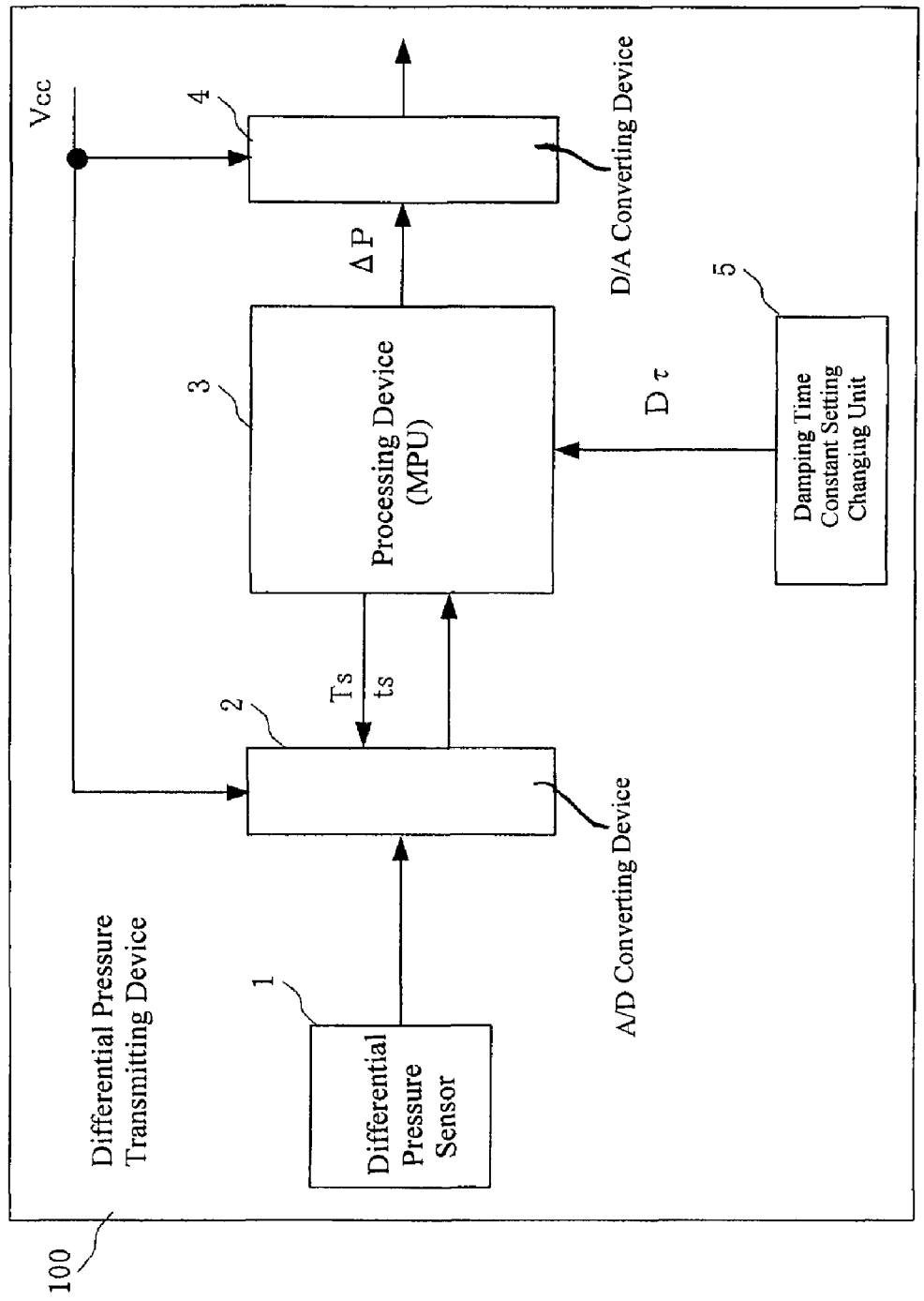
FIG. 1 is a block diagram illustrating the critical components in one example of a differential pressure transmitting device as set forth in the present invention.

FIG. 1 is a block diagram illustrating the critical components in an example of embodiment of a differential pressure transmitting device as set forth in the present invention. In this figure: 1 is a differential pressure sensor; 2 is an A/D converting device; 3 is a processing device (MPU); 4 is a D/A converting device; and 5 is a damping time constant setting changing unit (damping time constant setting changing means) that enable a change, in accordance with an operation by a user, the setting for a damping time constant DT used in the processing device 3.

In this differential pressure transmitting device 100, the differential pressure sensor 1 senses a differential pressure of a fluid, and sends, to the A/D converting device 2, an electric signal (an analog signal) in accordance with this differential pressure. The A/D converting device 2 is in constant operation, receiving the supply of a power supply voltage Vcc, and converts the electric signal that is in accordance with the differential pressure from the differential pressure sensor 1 into a digital value.

The processing device 3 has, as a function that is a feature of the present form of embodiment, a sampling condition automatic changing function, achieved through hardware, comprising a processor, a storage device, and the like, and through a program, which functions cooperatively with the hardware as the processing device to perform a variety of different functions. A specific example of the sampling condition automatic changing function possessed by the processing device 3 will be explained below in accordance with the flow charts in FIG. 2, FIG. 3, and FIG. 4.

Example of Changing the Sampling Period Automatically

Figure 2:
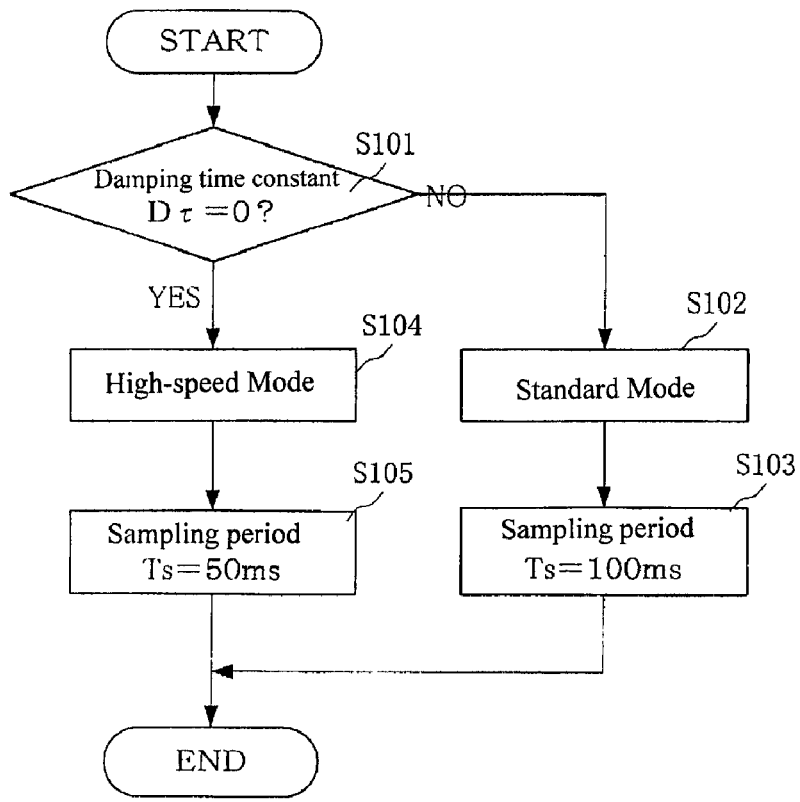
FIG. 2 is a flowchart illustrating one example of the process operations in accordance with the sampling condition automatic changing function possessed by a processing device in this differential pressure transmitting device.

The processing device 3 periodically checks the damping time constant DT that is currently set (FIG. 2: Step S101). If the damping time constant Dτ is Dτ≠0 (Step S101: NO), then the sampling mode is set to the standard mode (Step S102), and the sampling period Ts is set to Ts=100 ms (Step S103).

In contrast, if the damping time constant Dτ is Dτ=0 (Step S101: YES), then the sampling mode is set to the high-speed mode (Step S104), and the sampling period Ts is set to Ts=50 ms (Step S105).

Note that in the first example, the sampling interval ts is always a constant value (for example, at ts=30 ms) regardless of the damping time constant Dτ. That is, even if the damping time constant Dτ is changed, the sampling interval ts is maintained at ts=30 ms.

Standard Mode

If the damping time constant Dτ is Dτ≠0, so that the standard mode is set, then the processing device 3 samples, for a sampling interval ts=30 ms for each sampling period Ts=100 ms, the electric signal that has been converted into a digital value by the A/D converting device 2, and performs a variety of calculating processes, such as a smoothing calculation, a square root calculation, or the like, on the sampled electric signal to calculate a measured value ΔP for the differential pressure, and then outputs this calculated measured value of the P for the differential pressure through the D/A converting device 4. (See FIG. 5(a).) In this calculating process, the processing device 3 performs the damping operation using the damping time constant Dτ.

High-Speed Mode

If the damping time constant Dτ is changed to Dτ=0 through an operation by a user from the damping time constant setting changing unit 5, then the processing device 3 changes the sampling mode from standard mode to high-speed mode. In this case, the processing device 3 samples, for a sampling interval ts=30 ms for each sampling period Ts=50 ms, the electric signal that has been converted into a digital value by the A/D converting device 2, and performs a variety of calculating processes, such as a smoothing calculation, a square root calculation, or the like, on the sampled electric signal to calculate a measured value ΔP for the differential pressure, and then outputs this calculated measured value of the P for the differential pressure through the D/A converting device 4. (See FIG. 5(b).) In this calculating process, the processing device 3 does not performing the damping calculations.

Figure 5:
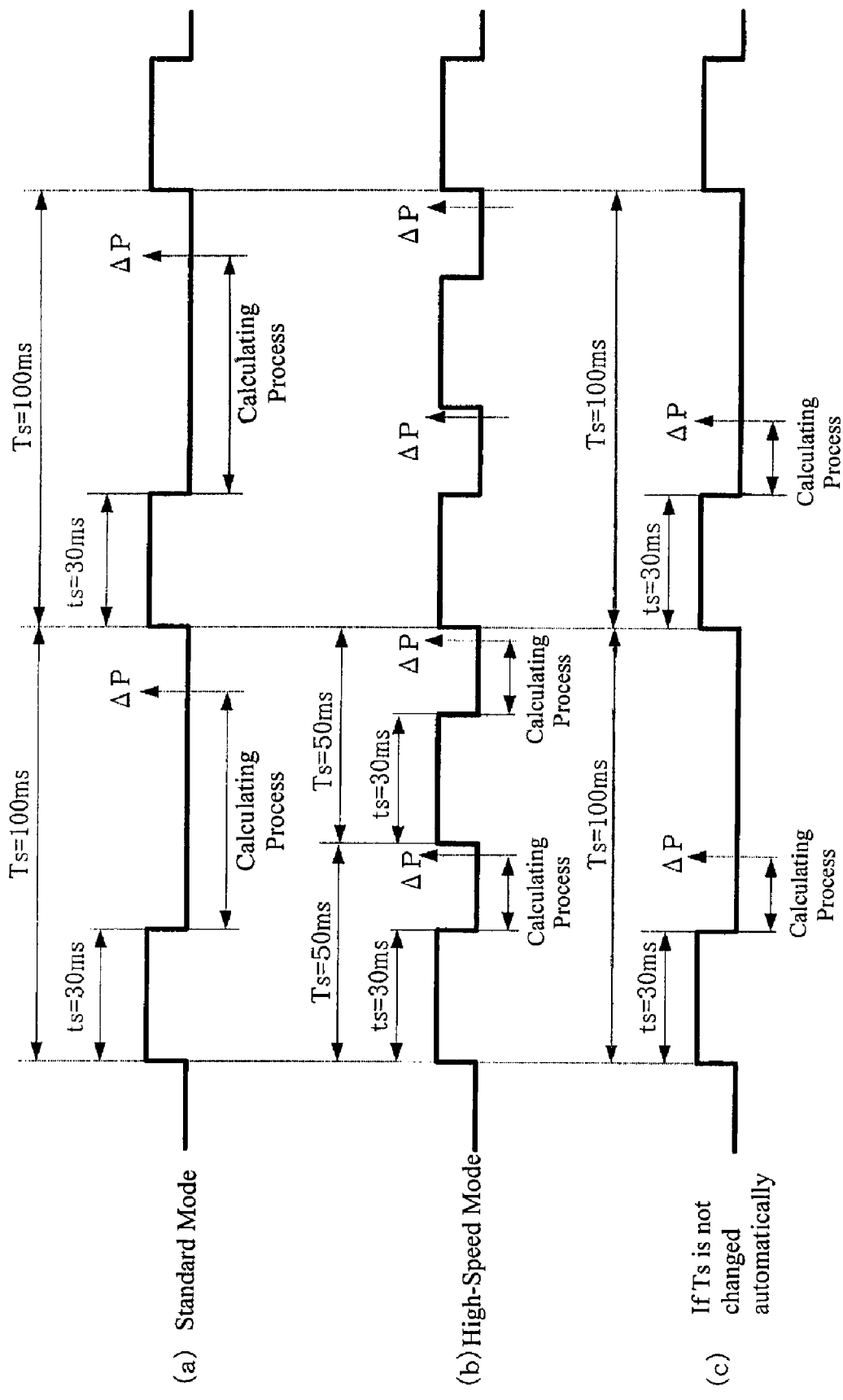
FIG. 5 is a timing chart for explaining the sampling operation when in the standard mode and when in the high-speed mode in an example of embodiment.

FIG. 5(c) illustrates a timing chart for the case wherein, when the damping time constant Dτ changes so that Dτ=0, the sampling period Ts is maintained at Ts=100 ms, and only the damping calculation is not performed.

As can be understood from a comparison of FIG. 5(b) and FIG. 5(c), when the sampling period Ts is changed from 100 ms to 50 ms (FIG. 5(b)), then the calculated value ΔP for the differential pressure can be obtained in a short time period, making it possible to respond to demands for high-speed responsiveness.

Example of Changing the Sampling Interval

Figure 3:
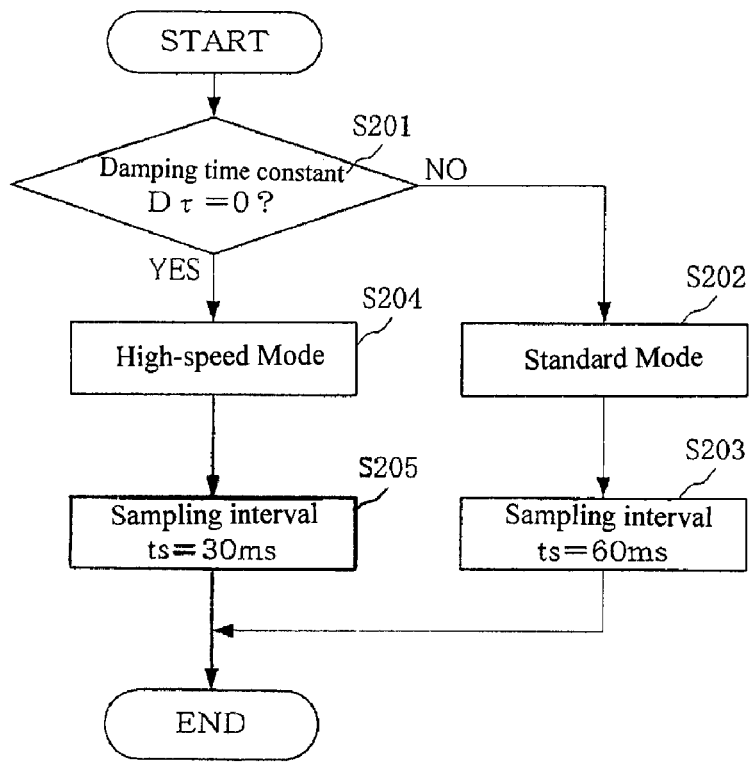
FIG. 3 is a flowchart illustrating another example of the process operations in accordance with the sampling condition automatic changing function possessed by a processing device in this differential pressure transmitting device.

The processing device 3 periodically checks the damping time constant Dτ that is currently set (FIG. 3: Step S201). If the damping time constant Dτ is Dτ≠0 (Step S201: NO), then the sampling mode is set to the standard mode (Step S202), and the sampling interval ts is set to ts=60 ms (Step S203).

In contrast, if the damping time constant Dτ is Dτ=0 (Step S201: YES), then the sampling mode is set to the high-speed mode (Step S204), and the sampling interval ts is set to ts=30 ms (Step S205).

Note that in the first example of embodiment, the sampling period Ts is always a constant value (for example, and Ts=100 ms) regardless of the damping time constant Dτ. That is, even if the damping time constant Dτ is changed, the sampling period Ts is maintained at Ts=100 ms.

Standard Mode

If the damping time constant Dτ is Dτ≠0, so that the standard mode is set, then the processing device 3 samples, for a sampling interval ts=60 ms for each sampling period Ts=100 ms, the electric signal that has been converted into a digital value by the A/D converting device 2, and performs a variety of calculating processes, such as a smoothing calculation, a square root calculation, or the like, on the sampled electric signal to calculate a measured value ΔP for the differential pressure, and then outputs this calculated measured value of the P for the differential pressure through the D/A converting device 4. (See FIG. 6 (a).) this calculating process, the processing device of 3 performs the damping operation using the damping time constant Dτ.

High-Speed Mode

If the damping time constant Dτ is changed to Dτ=0 through an operation by a user from the damping time constant setting changing unit 5, then the processing device 3 changes the sampling mode from standard mode to high-speed mode. In this case, the processing device 3 samples, for a sampling interval ts=30 ms for each sampling period Ts=100 ms, the electric signal that has been converted into a digital value by the A/D converting device 2, and performs a variety of calculating processes, such as a smoothing calculation, a square root calculation, or the like, on the sampled electric signal to calculate a measured value ΔP for the differential pressure, and then outputs this calculated measured value of the P for the differential pressure through the D/A converting device 4. (See FIG. 6 (b).) In this calculating process, the processing device 3 does not performing the damping calculations.

Figure 6:
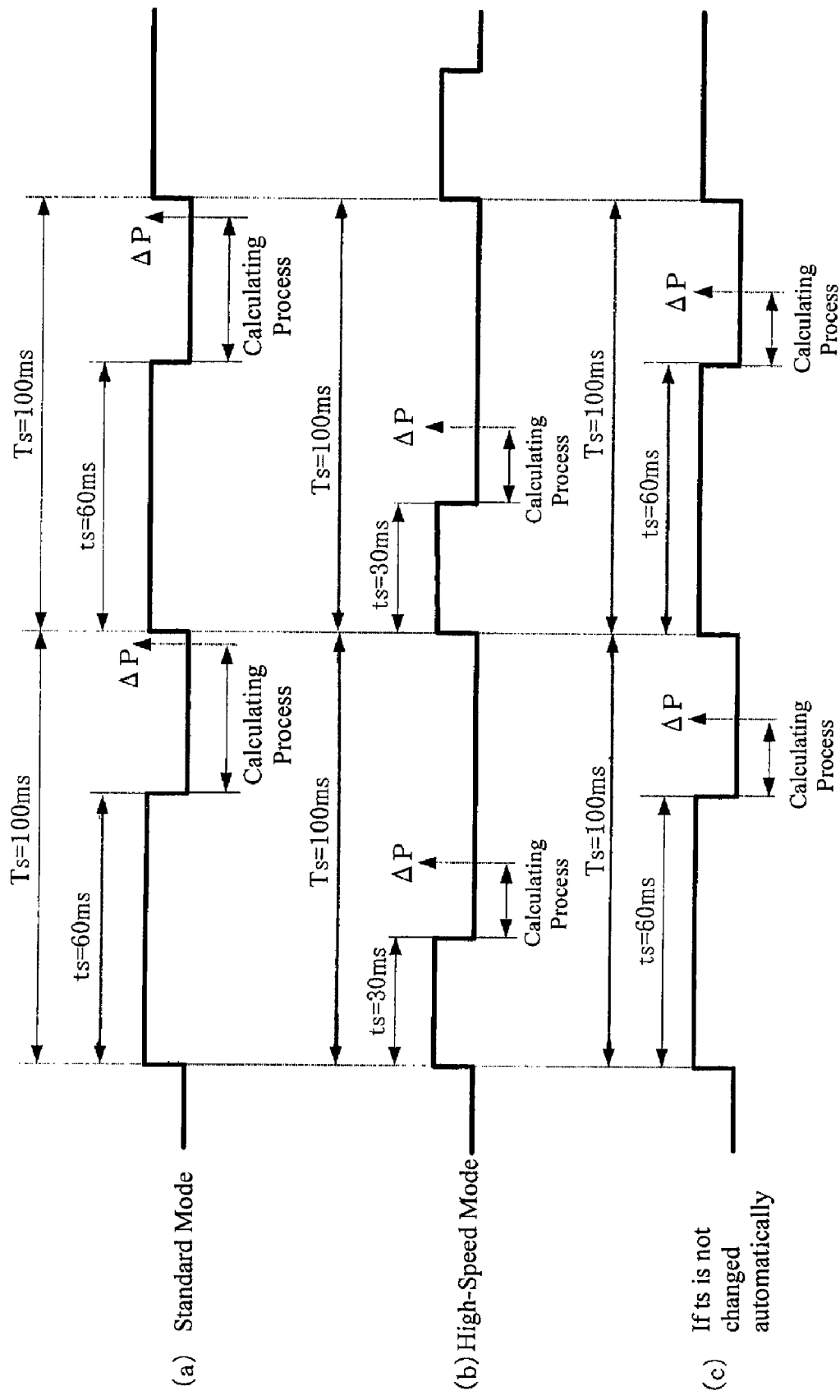
FIG. 6 is a timing chart for explaining the sampling operation when in the standard mode and when in the high-speed mode in another example of embodiment.

FIG. 6 (c) illustrates a timing chart for the case wherein, when the damping time constant Dτ changes so that Dτ=0, the sampling interval ts is maintained at ts=60 ms, and only the damping calculation is not performed.

As can be understood from a comparison of FIG. 6(b) and FIG. 6(c), when the sampling interval ts is changed from 60 ms to 30 ms (FIG. 6(b)), and after the beginning of the sampling period Ts, then the calculated value ΔP for the differential pressure can be obtained in a short time period, making it possible to respond to demands for high-speed responsiveness.

Example of Changing the Sampling Period and Sampling Interval

Figure 4:
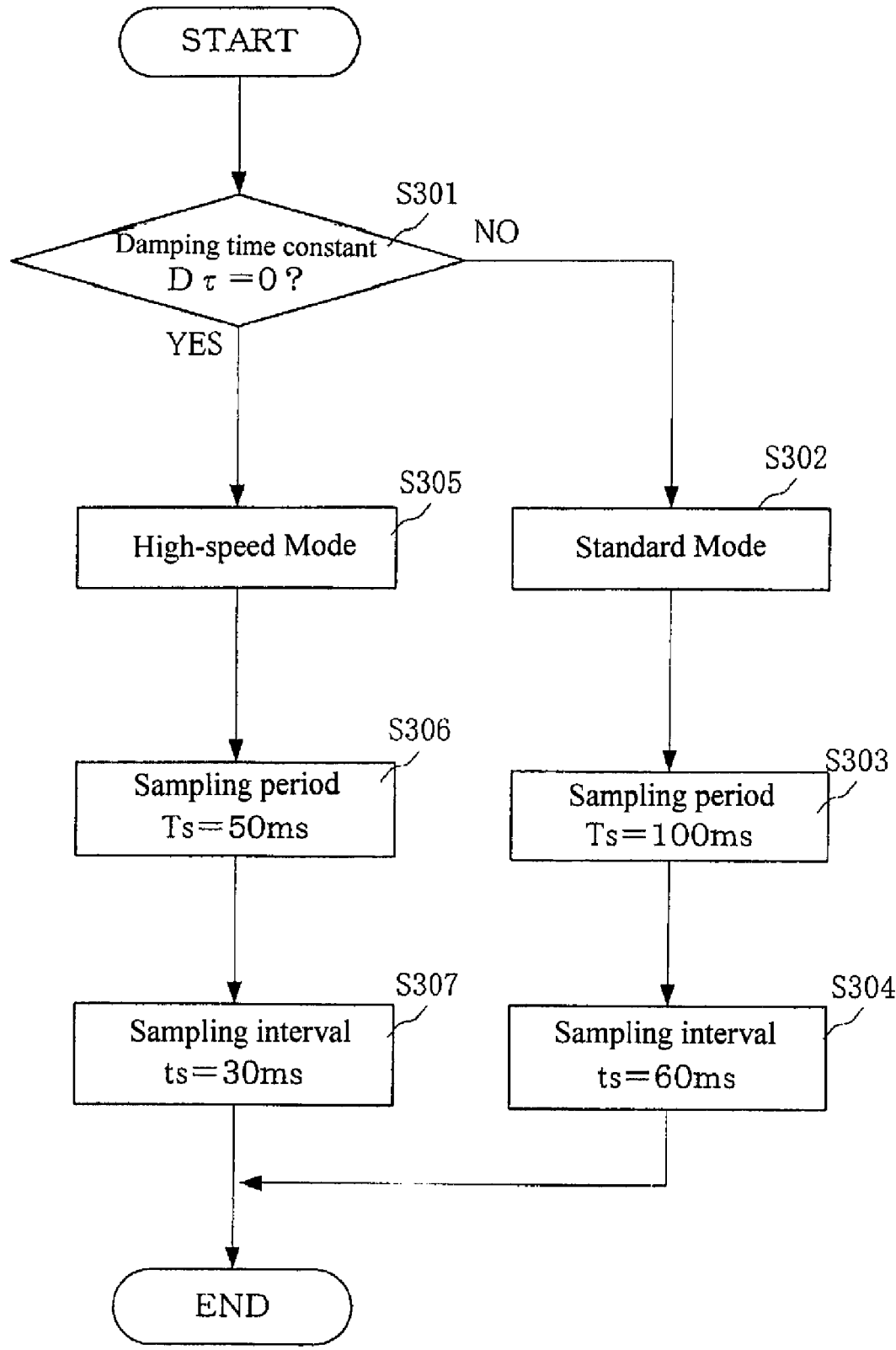
FIG. 4 is a flowchart illustrating another example of the process operations in accordance with the sampling condition automatic changing function possessed by a processing device in this differential pressure transmitting device.

The processing device 3 periodically checks the damping time constant Dτ that is currently set (FIG. 4: Step S301). If the damping time constant Dτ is Dτ≠0 (Step S301: NO), then the sampling mode is set to the standard mode (Step S302), the sampling period Ts is set to Ts=100 ms (Step S303), and the sampling interval ts is set to ts=60 ms (Step S304).

In contrast if the damping time constant Dτ is Dτ=0 (Step S301: YES), then the sampling mode is set to the high-speed mode (Step S305), the sampling period Ts is set to Ts=50 ms (Step S306), and the sampling interval ts is set to ts=30 ms (Step S307).

Standard Mode

If the damping time constant Dτ is Dτ≠0, so that the standard mode is set, then the processing device 3 samples, for a sampling interval ts=60 ms for each sampling period Ts=100 ms, the electric signal that has been converted into a digital value by the A/D converting device 2, and performs a variety of calculating processes, such as a smoothing calculation, a square root calculation, or the like, on the sampled electric signal to calculate a measured value ΔP for the differential pressure, and then outputs this calculated measured value of the P for the differential pressure through the D/A converting device 4. (See FIG. 7 (a).) this calculating process, the processing device of 3 performs the damping operation using the damping time constant Dτ.

High-Speed Mode

If the damping time constant Dτ is changed to Dτ=0 through an operation by a user from the damping time constant setting changing unit 5, then the processing device 3 changes the sampling mode from standard mode to high-speed mode. In this case, the processing device 3 samples, for a sampling interval ts=30 ms for each sampling period Ts=50 ms, the electric signal that has been converted into a digital value by the A/D converting device 2, and performs a variety of calculating processes, such as a smoothing calculation, a square root calculation, or the like, on the sampled electric signal to calculate a measured value ΔP for the differential pressure, and then outputs this calculated measured value of the P for the differential pressure through the D/A converting device 4. (See FIG. 7 (b).) In this calculating process, the processing device 3 does not performing the damping calculations.

Figure 7:
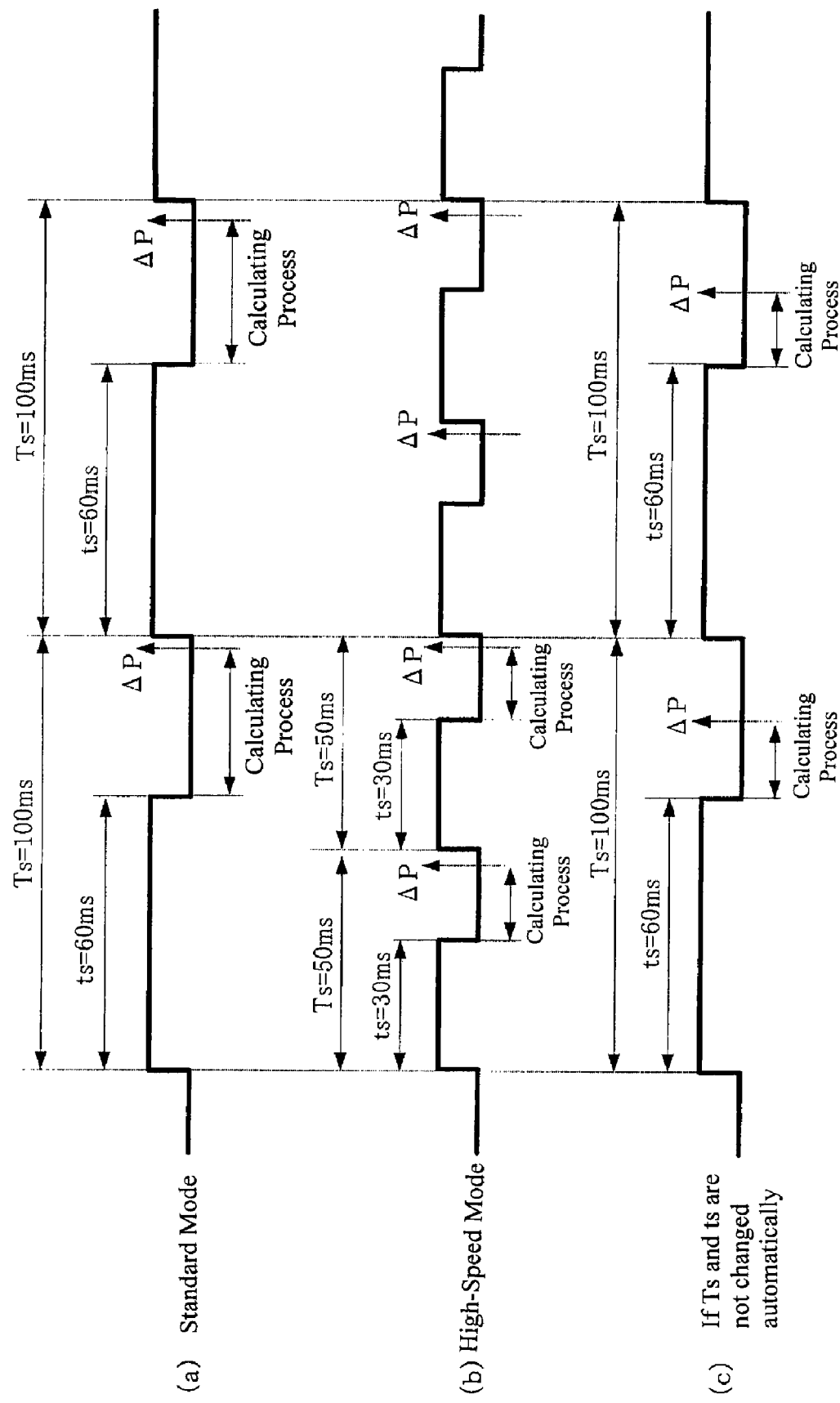
FIG. 7 is a timing chart for explaining the sampling operation when in the standard mode and when in the high-speed mode in a further example of embodiment.

FIG. 7 (c) illustrates a timing chart for the case wherein, when the damping time constant Dτ changes so that Dτ=0, the sampling period Ts is maintained at Ts=100 ms, the sampling interval ts is set to ts=60 ms, and only the damping calculation is not performed.

As can be understood from a comparison of FIG. 7 (b) and FIG. 7 (c), when the sampling period Ts is changed from 100 ms to 50 ms and the sampling interval ts is changed from 60 ms to 30 ms (FIG. 7(b)), then the calculated value ΔP for the differential pressure can be obtained in a short time period, making it possible to obtain the measurement value ΔP in a short time after the start of the sampling period Ts, making it possible to respond to demands for high-speed responsiveness.

In this example, both the sampling interval ts and the sampling period Ts are shortened, accelerating the timing with which the measured value ΔP of the differential pressure is calculated, making it possible to achieve a greater acceleration when compared to the standard mode.

Furthermore, it is possible to achieve the high speed responsiveness without the user being aware of the sampling period in the sampling interval, through changing the sampling period Ts and the sampling interval ts automatically based on the damping time constant Dτ, as in the examples set forth above. In addition, because a variety of applications can be handled using a single differential pressure transmitting device, this can contribute greatly to reducing the spare parts inventories of the customers.

Note that while in the examples set forth above, if the damping time constant Dτ was set to Dτ=0 then the high-speed mode was set, and the sampling period Ts was changed automatically from 100 ms to 50 ms, and/or the sampling interval ts was changed automatically from 60 ms to 30 ms; however, the threshold value for evaluating the change to the high-speed mode is not limited to Dτ=0. For example, the threshold value may be set at Dτ=1s, where the damping calculation is performed using the damping time constant Dτ if Dτ≦1s, and the sampling period Ts may be changed automatically from 100 ms to 50 ms and/or the sampling interval ts may be changed automatically from 60 ms to 30 ms in order to handle the requirements for high speed responsiveness.

Moreover, while in the examples set forth above, in the standard mode the sampling period Ts was set to 100 ms and in the high-speed mode the sampling period Ts was set to 50 ms, or in the standard mode the sampling interval ts was set to ts=60 ms and in the high-speed mode the sampling time Ts was set to 30 ms, there is no limitation, of course, to these particular values for the sampling period Ts and for the sampling interval ts in the standard mode and the high-speed mode.

Additionally, in the examples set forth above, the sampling period Ts and/or the sampling interval ts may be changed by dividing into several regions according to the damping time constant Dτ, so as to increase the number of sampling modes. For example, three different modes may be provided: (1) a high-speed mode (for those applications that particularly emphasize high speed responsiveness of the differential pressure transmitting device), (2) the standard mode (for those applications that wish to eliminate external noises (for example, the noise in commercial power) while maintaining some degree of responsiveness), and (3) the high-stability mode (the low-speed mode: for those applications that emphasize stability in the output of the differential pressure transmitting device, and which suppress instability in the process input in addition to suppressing the external noise of the standard mode), where, if Dτ=0, then the high-speed mode is set (where the sampling period Ts=50 ms and the sampling interval ts=30 ms), if Dτ≦1 second, then the standard mode is set (where the sampling period Ts=100 ms and the sampling interval ts=60 ms), and where if Dτ>1 second, the high stability mode is set (where the sampling period Ts=200 ms and the sampling interval ts=120 ms), wherein it is possible to switch the mode depending on the value of the damping time constant ADτ.

While the circuits will be more complex, adding a function for switching the A/D filter constants (the resistance and capacitance) when inputting the electric signal into the A/D converting device 2 and switching to be D/A filter constants (the resistance and capacitance) when outputting the electric signal from the D/A converting device 4, depending on the value of the damping time constant DT enables even greater accelerations and greater increases in stability to be achieved. For example, when Dτ=0, the sampling period Ts is set to 50 ms, the sampling interval ts is set to 30 ms, and the A/D filter constants and D/A filter constants are reduced. When Dτ>1 s, the sampling period Ts is set to 100 ms, the sampling time Ts is set to 60 ms, and the A/D filter constants and D/A filter constants are increased. The addition of such a function makes it possible to achieve further increases in speed and further increases instability.

Figure 8:
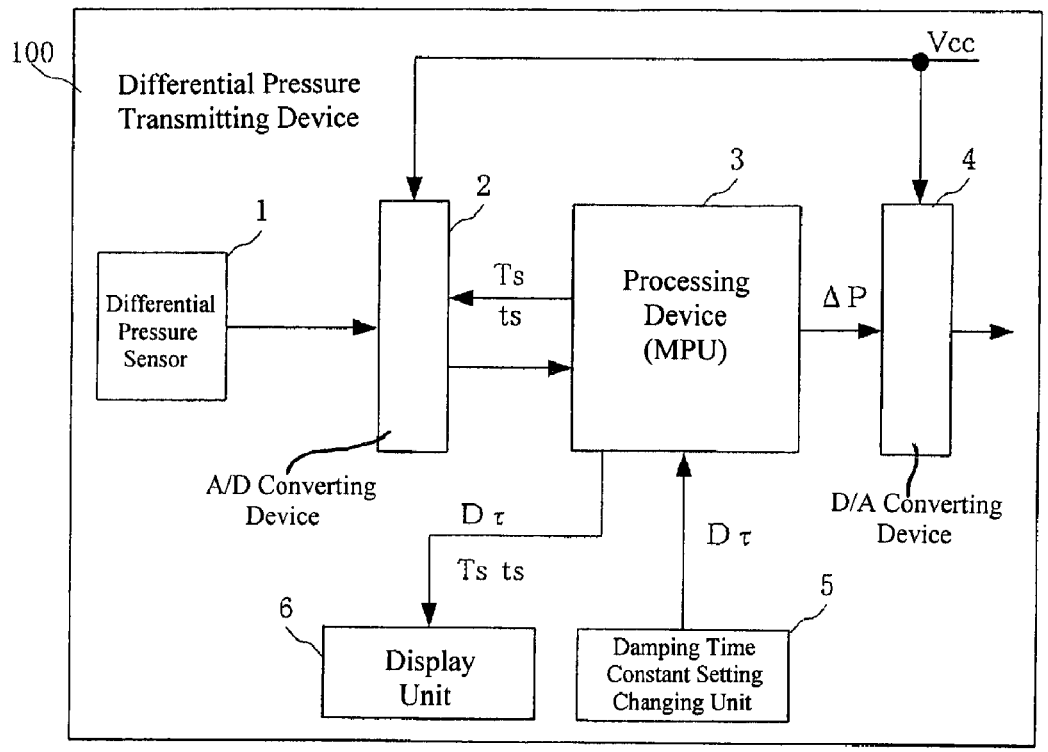
FIG. 8 is a diagram illustrating an example wherein a display portion is provided for displaying, as setting conditions, the damping time constant and the sampling conditions (the sampling period and the sampling interval), used by the processing device.

Additionally, in the examples set forth above, a display unit (setting condition displaying means) 6 may be provided as illustrated in FIG. 8, and the damping time constant Dτ used by the processing device 3 may be displayed on the display unit 6 as a setting condition for the sampling conditions (the sampling period Ts and the sampling interval ts). Doing so enables the current setting conditions to be known, to be referenced when changing the settings for the damping time constant Dr and the sampling conditions.

Additionally, while in the examples set forth above, the damping time constant Dτ was used as a parameter for setting the speed of the calculating process when calculating the measured value for the differential pressure and the sampling period Ts and/or the sampling interval ts were/was changed based on this damping time constant Dτ, instead the parameter for determining the speed for the targeting process when calculating the measured value for the differential pressure is not limited to the damping time constant Dτ. For example, instead the exponents in a polynomial equation for a compensating calculation used in the calculating process when calculating the measured value for the differential pressure may be used as the parameters, and the sampling period Ts and the sampling interval ts may be changed automatically based on the polynomial exponents.

Figure 9:
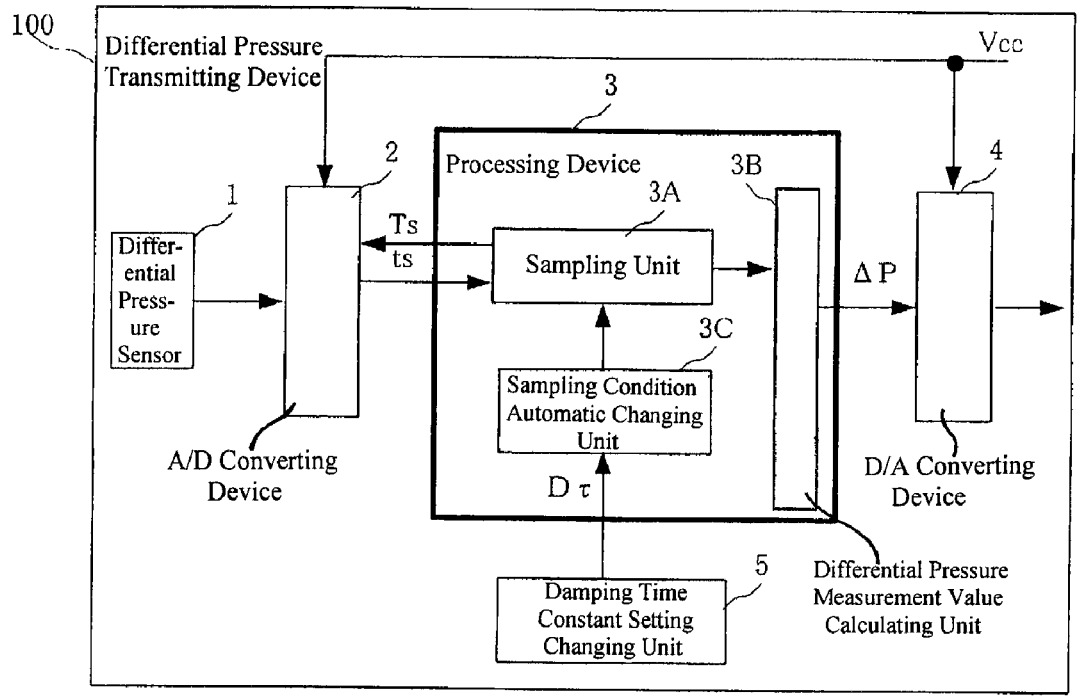
FIG. 9 is a block diagram of the functions within the processing device in the differential pressure transmitting device.
Figure 10:
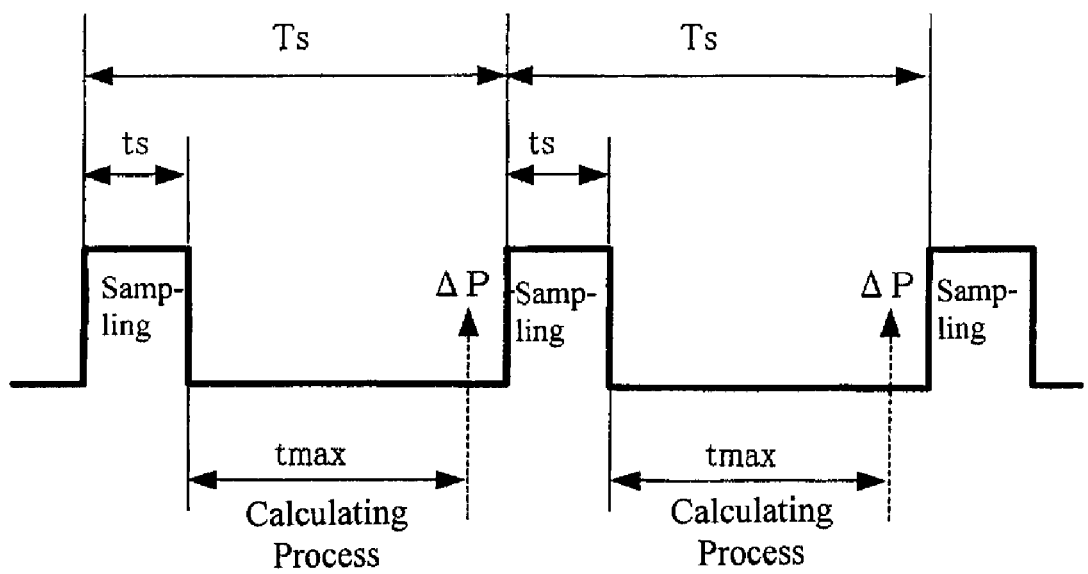
FIG. 10 is a timing chart for explaining the sampling operation in a conventional differential pressure transmitting device.

FIG. 9 illustrates a block diagram of the functions within the processing device 3 of the differential pressure transmitting device 100 set forth above. In the differential pressure transmitting device 100, the processing device 3 is provided with a sampling unit (sampling means) 3A, a differential pressure measured value calculating unit (differential pressure measured value calculating means) 3B, and a sampling condition automatic changing unit (sampling condition automatic changing means) 3C. The sampling unit 3A samples, over a sampling interval ts with each sampling period Ts, the electric signal that is in accordance with the pressure differential in the fluid, sensed by the differential pressure sensor 1. The differential pressure measured value calculating unit 3B calculates the measured value ΔP for the differential pressure by performing a variety of processes including, at least, a damping calculation, on the electric signal sampled by the sampling unit 3A. The sampling condition automatic changing unit 3C changes, automatically, the sampling period Ts and/or the sampling interval ts in the sampling unit 3A so as to be shorter when the damping time constant Dτ is Dτ=0, based on the damping time constant Dτ.

The differential pressure transmitting device according to the present invention can be used in a variety of fields as a device for sensing and transmitting the differential pressure of a fluid in, for example, fuel control in a gas turbine generator.

The invention claimed is:

1. A differential pressure transmitting device comprising:
a differential pressure sensor sensing a differential pressure in a fluid;
a sampling device sampling, over a specific sampling interval at each specific sampling period, an electric signal that is in accordance with the differential pressure of the fluid, sensed by the differential pressure sensor;
a differential pressure measured value calculator calculating a measured value for the differential pressure by performing a calculating process including, at least, a first-order delay calculation, on an electric signal sampled by the sampling device; and
a sampling condition automatic changer changing automatically a sampling condition, so as to be shorter, when a calculating process speed is to be made faster, based on a parameter that determines the calculating processing speed, with the sampling period and/or the sampling interval as the sampling conditions.

2. The differential pressure transmitting device as set forth in claim 1, wherein:
the parameter for determining the speed of the calculating process is defined as a damping time constant used in the first-order delay calculation; further comprising:
damping time constant setting changer configured to change the setting of the damping time constant.

3. The differential pressure transmitting device as set forth in claim 2, further comprising:
setting condition display displaying at least one of the damping time constant and the sampling condition.

* * * * *